INVENTOR.
ALBERT H. GENTER
BY William D. Carothers
HIS ATTORNEY

United States Patent Office 3,139,174
Patented June 30, 1964

3,139,174
DRAG CONVEYOR FLIGHT
Albert H. Genter, 769 Larchmont Road,
Mount Lebanon, Pa.
Filed Mar. 30, 1961, Ser. No. 99,472
1 Claim. (Cl. 198—175)

This invention relates generally to drag conveyors and more particularly to improvements on the flight itself.

The working and return section of an endless conventional drag conveyor are entrained in a conveyor trough with bottom and side walls. These side walls provide a track for the side endless chains that drag the transverse conveyor flights over the bottom of the conveyor trough. Different structural arrangements have been made to make the flights of a drag conveyor removable from their operating position between the spaced chains. These flights must be removable to make them readily replaceable from between the spaced chains because they frequently become bent or misshaped and prevent smooth operation of the conveyor.

Ordinarily the whole of a flight of a drag conveyor is constructed of a tube of rectangular cross section, one end of which is permanently secured to a chain attaching member which has a stem to fit into a socket in a link of the chain. The other chain attaching member has a similar stem but it is bolted to the tube and when the bolt is removed the chain attaching member may be slid into the tube and with one end free allow the flight to be removed from between the chains in the conveyor trough. The long hollow flight tube will readily bend and its detachable end may become lodged within the tube which gives rise to difficulties in applying or removing the flight from between the drag chains.

The structure of this invention avoids these difficulties and provides a much stronger and improved flight. The flights making up this invention comprise a pair of tubular flight sections each shorter than one-half of the normal lengths of the flight needed and each flight section is permanently secured to its chain attaching member. Thus each section of this flight is a duplicate of each other. The intermediate gap is filled with a solid bar that fits and extends an equal distance into each tubular section of the flight. The fact that the bar has a sliding fit with the tube bore provides a much stronger center flight section than if the whole length of the flight was a tube.

When the stems or chain engaging portions of the chain attaching members of each flight section are in position in their respective chain and the center bar extends an equal distance into each flight section tube, the spacing between the inner adjacent ends of the tubes is slightly greater than that required to insert a stem into the chain socket. The bar is held in this centered position by a transverse pin entering into each flight tube section at the end of said flight center bar. These pins and the flight center bar thus prevent the stems of the chain attaching members on the flight tube sections from withdrawing from the chains and the side walls of the trough prevent the chains from moving off the stems. This provides a very strong and easily removable flight as one merely removes one transverse pin to shove one flight section toward the other pin and lift the flight from the conveyor chain and trough.

This materially facilitates the initial insertion or exchange of flights in a drag conveyor. It provides for a stronger flight structure and it is materially less expensive to make as the flight sections are identical and the center bar is plain having nothing thereon.

Other objects and advantages appear hereinafter in the following description and claims.

The accompanying drawings show for the purpose of exemplification without limiting the invention or claim thereto certain practical embodiments illustrating the principles of this invention wherein:

Figure 1:
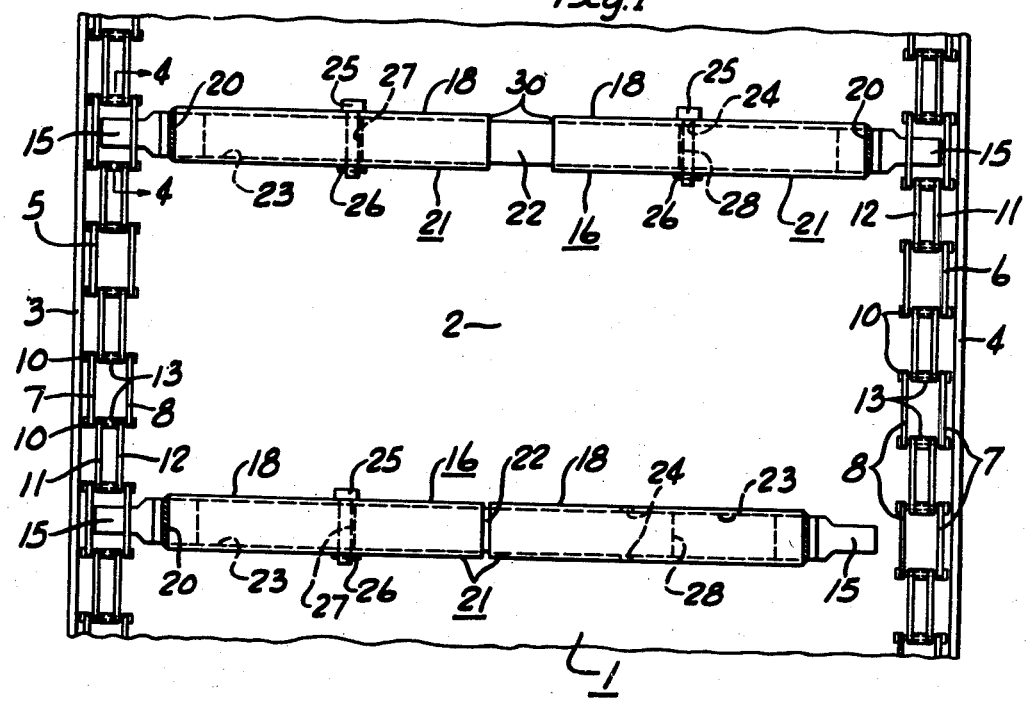
FIG. 1 is a plan view of a drag conveyor with parts broken away.

Referring to the drawings, the drag conveyor includes the conveyor trough 1 made up of a bottom section 2 with side walls 3 and 4 that form a trough for the conveyor chains 5 and 6 that are operated by the sprocket members mounted on a shaft at each end of the conveyor, one shaft of which is ordinarily provided with power means for driving the same. The sprocket members are secured to their shaft so as to maintain the chains 5 and 6 in unison as they travel around the end of the path. A drag conveyor of this character ordinarily has a return path enclosed underneath the upwardly open trough 1 and the chains 5 and 6 are still retained between the side walls 3 and 4 but immediately below that section illustrated in FIG. 1.

The chains 5 and 6 are each made up of parallel links connected by pivot members. Alternate pairs of links are retained within each other, that is, the links 7 and 8 mounted on the pivot members 10 are on the outside of the alternate parallel links 11 and 12 and the pivot members 10 have a roller spacer 13 therebetween to maintain the proper spaced relation between the consecutive sections of alternate pairs of parallel links.

Figures 3, 4:
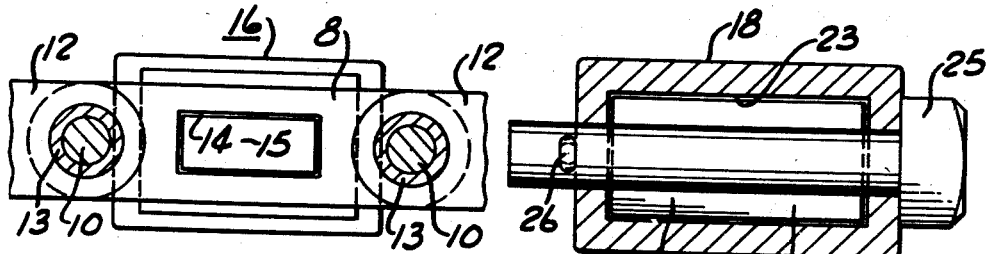
FIG. 3 is a view in cross section of a flight taken on the line 3—3 of FIG. 2.
FIG. 4 is a sectional view taken along the line 4—4 of FIG. 1.

Each link 8 is provided with an opening 14 to receive the stem or chain engaging portion 15 at the ends of the conveyor flight member 16. The stem 15 extends from a cast steel member the body 17 of which extends into a rectangular tubular section 18 of the flight and is welded in place as illustrated at 20. The stem or chain engaging portion 15 and the body 17 together form a chain attaching member. The tubular section 18 is preferably of rectangular cross section as illustrated in FIG. 3. The stem or chain attaching member of the conveyor flight 16 together with the tubular section 18 represent the tubular flight section 21 of which a pair is required for each flight 16. The length of the tubular section 18 is determined by the gauge of the chains 5 and 6.

Figure 2:
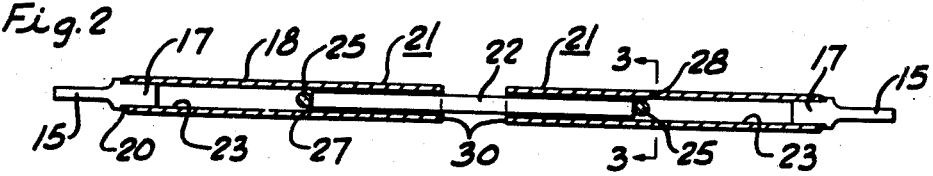
FIG. 2 is a vertical section of one flight member on the drag conveyor.

To complete this conveyor flight 16 one is required to employ a reinforcing connecting bar 22 which is a plain rectangular bar stock capable of entering the passage 23 within the tubular section 18. The bar 22 slides into the passage 23 of each of the tubular sections 18 as shown in FIG. 1 and each tubular section is provided with transverse openings 24 for receiving the pin members or stop means 25 which may be a nut and bolt but is preferably a headed pin having a cotter key 26 at its opposite end. The pins 25 merely pass through the tubular sections 18 adjacent the opposite ends 27 and 28 of the bar 22 as illustrated in FIG. 2. Thus the pins or stop means 25 prevent the bar 22 from passing any further into the tubular sections 18 and when properly gauged a gap such as illustrated at 30 in FIG. 1 exists between the ends of the tubular sections 18, allowing the bar 22 to be exposed for this distance. This gap is preferably a little greater than the length of the stem or chain engaging portion 15 so as to allow the stem to be withdrawn clear of the link 8 as illustrated in FIG. 1 when one of the pins 25 has been withdrawn from the aligned openings 24 which permits the end of the bar 28 to pass beyond the openings 24, allowing the tubular sections to approach one another as illustrated in FIG. 1, thus withdrawing the stem from the link 8 of the chain 6 to permit the flight 16 to be inserted or withdrawn from the chains 5 and 6.

When the right hand tubular section 18 is moved to the right at the lower portion of FIG. 1 so that the stem 15 enters the opening 14 in the link 8 the aligned openings 24 will be beyond the end 28 of the bar 22 and the pin 25 may then be inserted therein as illustrated in the upper part of FIG. 1 or in FIG. 3. After the pin is inserted the cotter key 26 is slipped in place and thus retains the conveyor flight.

It will be obvious from the drawings that the bar 22 is substantially half the length of the conveyor flight 16. This being a solid steel bar of rectangular cross section provides materially greater strength in the center of the flight where it is needed and where conveyor flights of this character usually bend. Thus this improvement not only provides a more readily insertable or removable conveyor flight but also provides a substantially improved conveyor flight strengthwise, which eliminates material difficulties experienced with structures of this character in that the conveyor flights do not bend so readily yet are very easily handled and inserted and removed.

There is no necessity of attaching the bar 22 to either of the flight sections 21 since the conveyor trough 1 with the sides 3 and 4 retain the chain in proper relation, not permitting it to expand, which would release the flight. The extension of the chains to each other would of course have to be of considerable dimensions such as that illustrated at 30 in FIG. 1 in order to release the flight.

Since each conveyor flight 16 comprises duplicate sections 21 and a mere length of bar stock 22 the cost of the conveyor flight is materially reduced over that presently employed. The conveyor flights such as shown can be constructed as illustrated at 22 in FIG. 1 and have different lengths of conveyor flights. The bar 22 can be made longer, that is, if it is necessary to make the tubular sections 18 of each of the conveyor flights longer as the bar 22 provides sufficient strength for this purpose. However if it is desired one may increase the length of each of the tubular sections 18 when the flight is required to be longer so as to provide the same gap 30 as illustrated in FIG. 1.

This construction also eliminates difficulties in making connections and disconnections adjacent the end of the flight as in the present structures.

The bar 22 may be made long enough so as to position the pins 25 close to the outer portion of the tubular sections 18.

I claim:

A conveyor flight for use between spaced entrained conveyor chains consisting of a pair of tubular members, a chain attaching member secured to one end of each of said tubular members and having a chain engaging portion for opposed insertion in the spaced entrained conveyor chains, the other ends of said tubular members being open, a bar slidably fitting within the open ends of said tubular members, stop means extending into each of said tubular members to engage the ends of said bar and prevent further movement of said bar in each of said tubular members and to limit in each tubular member the spacing between the end of said bar and the adjacent chain attaching member a distance at least equal to the length of one chain engaging portion of a chain attaching member, said stop means located to space the open ends of said tubular members from each other a distance at least as long as a chain engaging portion of a chain attaching member, at least one of said stop means being retractable to permit its tubular member to slide inwardly over said bar to withdraw either chain engaging portion from a selected conveyor chain to remove the entire conveyor flight from between the spaced entrained conveyor chains.

References Cited in the file of this patent

UNITED STATES PATENTS

| | | |
|---|---|---|
| 349,346 | Grater | Sept. 21, 1886 |
| 848,236 | Ginaca | Mar. 26, 1907 |
| 2,544,484 | Blackburn | Mar. 6, 1951 |
| 2,619,390 | Johnson | Nov. 25, 1952 |
| 2,773,257 | Craggs et al. | Dec. 4, 1956 |
| 2,954,864 | Lee et al. | Oct. 4, 1960 |